US012679946B2

(12) United States Patent
Orendorz et al.

(10) Patent No.: US 12,679,946 B2
(45) Date of Patent: Jul. 14, 2026

(54) PROCESS FOR PRODUCING A PARTICULATE RECYCLATE FROM QUARTZ COMPOSITE

(71) Applicant: Schock GmbH, Regen (DE)

(72) Inventors: Adam Orendorz, Zwiesel (DE);
Thomas Rösener, Deggendorf (DE);
Raphael Sperberg, Freital (DE)

(73) Assignee: SCHOCK GMBH, Regen (DE)

( * ) Notice: Subject to any disclaimer, the term of this patent is extended or adjusted under 35 U.S.C. 154(b) by 884 days.

(21) Appl. No.: 17/968,949

(22) Filed: Oct. 19, 2022

(65) Prior Publication Data

US 2023/0127475 A1 Apr. 27, 2023

(30) Foreign Application Priority Data

Oct. 22, 2021 (DE) ..................... 10 2021 127 484.2

(51) Int. Cl.
| | |
|---|---|
| *C08J 11/06* | (2006.01) |
| *B29B 17/04* | (2006.01) |
| *C08K 3/36* | (2006.01) |
| *E03C 1/12* | (2006.01) |

(52) U.S. Cl.
CPC ............... *C08J 11/06* (2013.01); *B29B 17/04* (2013.01); *C08K 3/36* (2013.01); *B29B 2017/0488* (2013.01); *C08J 2333/12* (2013.01); *E03C 1/12* (2013.01)

(58) Field of Classification Search
CPC ............................................. B29B 2017/0488
See application file for complete search history.

(56) References Cited

U.S. PATENT DOCUMENTS

| | | | |
|---|---|---|---|
| 6,740,697 | B1 | 5/2004 | Brenner |
| 7,935,744 | B2 | 5/2011 | Kim |
| 9,427,896 | B1 | 8/2016 | Xie |
| 10,124,372 | B2 * | 11/2018 | Linke .................... C21D 6/004 |
| 10,519,294 | B2 | 12/2019 | Bugiolacchio |
| 10,967,386 | B2 | 4/2021 | Nomura |
| 2007/0244222 | A1 | 10/2007 | Ghahary |
| 2009/0104382 | A1 | 4/2009 | Harel |
| 2010/0127425 | A1 | 5/2010 | MacKinnon |
| 2011/0275737 | A1 | 11/2011 | Kim |
| 2020/0094443 | A1 | 3/2020 | Schäfer |

FOREIGN PATENT DOCUMENTS

| | | |
|---|---|---|
| CN | 208018704 U | 9/1998 |
| DE | 4324237 A1 | 1/1995 |
| DE | 29923704 U1 | 4/2001 |

(Continued)

OTHER PUBLICATIONS

Translation of JPH10249860A (Year: 2025).*

(Continued)

*Primary Examiner* — Matthew Katcoff
(74) *Attorney, Agent, or Firm* — LUCAS & MERCANTI, LLP; Klaus P. Stoffel

(57) ABSTRACT

A process for producing a particulate recyclate from quartz composite by comminuting quartz composite moldings composed of a polymer matrix with inorganic and/or organic filler particles embedded therein, wherein precomminuted pieces of molding are comminuted in a hammer mill to form particles that form the recyclate.

17 Claims, 4 Drawing Sheets

(56) References Cited

FOREIGN PATENT DOCUMENTS

| DE | 102015006152 | B4 | 11/2016 |
|----|----|----|----|
| EA | 6345 | B1 | 12/2005 |
| EP | 0395128 | A1 | 10/1990 |
| EP | 0635308 | A1 | 1/1995 |
| EP | 3093082 | A1 | 10/2018 |
| EP | 3093082 | B1 | 10/2018 |
| EP | 3440128 | B1 | 2/2019 |
| JP | S50061878 | A | 5/1975 |
| JP | H05022042 | U | 3/1993 |
| JP | H05237948 | A | 9/1993 |
| JP | H10249860 | A | 9/1998 |
| JP | 3369234 | A | 1/2003 |
| JP | 2020519751 | A | 7/2020 |
| KR | 20150048524 | A | 5/2015 |
| KR | 20190107733 | A | 9/2019 |
| RU | 2070855 | C1 | 12/1996 |
| RU | 2160239 | C1 | 12/2000 |
| SU | 351577 | A1 | 9/1972 |
| WO | 2014020532 | A1 | 2/2014 |
| WO | 2016177662 | A1 | 11/2016 |
| WO | 2020228925 | A1 | 11/2020 |

OTHER PUBLICATIONS

German Patent Application No. DE 10 2021 127 484.2 an opposition report of the German Patent and Trademark Office dated Jun. 17, 2024, 5 Pages.

LIFE Green Sinks—Final Report. Brussel: Europaische Kommission, [2015] (LIFE12 ENV/IT/000736). S. 1-24.

Korean Patent Office issued an Office Action on Mar. 7, 2025 regarding parallel Korean Patent Application No. 10-2022-0132080, 9 Pages.

CNIPA issued an Office Action on Nov. 1, 2024 regarding parallel Chinese Patent Application No. 202211170859.8, 10 Pages.

Russian Patent Office issued an Office Action and a Search Report on Apr. 19, 2023 regarding parallel Russian Patent Application No. 2022127185, 10 pages.

Canadian Patent Office issued an Office Action on Jun. 2, 2025 regarding parallel Canadian Patent Application No. 3,178,141, 6 Pages.

Chinese Patent Office issued an Office Action on Jun. 21, 2025 regarding parallel Chinese Patent Application No. 202211170859.8, 4 Pages.

European Patent Office issued a Search Report on Feb. 14, 2023 regarding parallel European Patent Application No. 22197312, 2 pages.

"LIFE Project Number LIFE Green Sinks Project Data", Dec. 31, 2015 (Dec. 31, 2015), pp. 1-24.

Guidance Notes on Project Reporting FP7 Collaborative Projects, Networks of Excellence, Coordination and Support Actions, Research for the benefit of Specific Groups (in particular SMEs) Contents, Dec. 31, 2012 (Dec. 31, 2012), pp. 1-38.

Japanese Patent Office issued an Office Action on Dec. 5, 2023 regarding parallel Japanese Patent Application No. 2022-168573, 7 Pages.

Indian Patent Office issued an Office Action on Jan. 31, 2024 regarding parallel Indian Patent Application No. 202244058138, 6 Pages.

German Office Action Dated Sep. 13, 2022, 5 Pages.

Canadian Patent Office issued an Office Action on Mar. 27, 2024, regarding parallel Canadian Patent Application No. 3178141, 5 Pages.

European Patent Office issued an Office Action on Apr. 4, 2024 regarding parallel European Patent Application No. 22197312.6, 7 Pages.

* cited by examiner

PROCESS FOR PRODUCING A PARTICULATE RECYCLATE FROM QUARTZ COMPOSITE

CROSS-REFERENCE TO RELATED APPLICATIONS

The present application claims priority of DE 10 2021 127 484.2, filed Oct. 22, 2021, the priority of this application is hereby claimed, and this application is incorporated herein by reference.

BACKGROUND OF THE INVENTION

The invention relates to a process for producing a particulate recyclate from quartz composite by comminuting quartz composite moldings made from a polymer matrix with inorganic filler particles embedded therein.

Quartz composite moldings are known in different forms. For example, kitchen sinks, shelves, sanitary articles such as shower trays or shower baths, but also floor or wall panels, upstands or the like, are made from quartz composite. These moldings consist primarily of a polymer matrix, for example based on acrylate, wherein filler particles are embedded into the cured polymer matrix. These may be inorganic or organic filler particles. An example of one such filler used is quartz sand. Frequently, color pigments are also embedded into the polymer matrix in order to impart a particular color to the molding.

Over the course of time, used moldings that are no longer required will inevitably accumulate either because they have been exchanged after a prolonged period in the course of renovation or rebuilding measures, because they are defective or for other reasons. Of course, corresponding offcuts also accumulate in the course of production of new moldings, which are unsaleable. With increasing use of such quartz composite moldings, there will thus inevitably also be an increase in the amount of used parts that are no longer needed. These are usually disposed of in disposal facilities.

SUMMARY OF THE INVENTION

The problem addressed by the invention is therefore that of specifying a process that enables the further utilization of such quartz composite moldings.

This problem is solved by providing a process for producing a particulate recyclate from quartz composite by comminuting quartz composite moldings, in which precomminuted molding pieces are comminuted in a hammer mill to form particles that form the recyclate.

In the process of the invention, precomminuted molding pieces are comminuted in a hammer mill, during which comminution particles within a target grain size range that the particulate recyclate is to have are indeed obtained to a sufficient degree. In such a hammer mill, the grinding material is comminuted by kinetic percussion and impact comminution. A multitude of movable hammers are mounted on a rotor, and these rotate within the mill housing by means of the rotor. The hammers hit the grinding material, i.e. the molding pieces, as a result of which they are comminuted. In addition, the comminuted pieces are also thrown against the housing wall, as a result of which they are crushed further. During the dwell time of the grinding material within the housing, the grinding material is hit continuously and comminuted further on account of the relatively high speed of rotation of the rotor and hence the hammers. Correspondingly small particles are formed here, which to a notably high degree have a grain size which is in the region of a desired target grain size or else is smaller in the fines content.

It has now been found that, surprisingly, the grinding material, i.e. the molding pieces, is comminuted sufficiently in such a hammer mill at room temperature, firstly obtaining a sufficiently high proportion of particles having a desired particle size distribution that form the recyclate in just one grinding operation, and secondly and particularly advantageously without formation of lumps or briquets, i.e. formation of large particles that cannot be used as recyclate, especially as recyclate to be added to a casting compound for the production of new parts. In other mills, for example a roll mill, the comminution is effected by shearing of the grinding material, meaning that a high shear energy is introduced. It can be assumed that this shear energy leads to heating of the crushed particles, which in turn leads to softening of the polymer matrix, at least in the region of the surface. The individual particles therefore become slightly tacky, which is likely to be the cause of the formation of lumps or briquets. It has now been found that, surprisingly, such processes do not take place in a hammer mill since the material is not subjected to any shear stress therein, but merely percussion energy is supplied, or impact energy in the case of throwing against the housing wall. These energies or energy inputs do not lead to excessive heating of the particles, and so there is surprisingly no surface tack and hence formation of lumps or briquets. Therefore, the grinding material can advantageously be ground even for a prolonged period in such a hammer mill, which in turn results in a sufficiently high proportion of the amount of particles within the target grain size range within the grinding time.

Therefore, the process of the invention for the first time permits the production of a sufficiently large amount of particles that form the recyclate, and secondly the production thereof in an economically viable manner. Consequently, the process of the invention allows convenient recycling of corresponding used parts made of quartz composite to form a particulate recyclate that can be reused as admixture, for example even as admixture to a casting compound for production of new quartz composite parts.

In a development of the invention, it may be the case that a sieve is used to remove a particle fraction comprising particles having a maximum target grain size that form the recyclate. In this first configuration of the invention, the only particle fraction removed from the hammer mill via a sieve is that containing particles having the target grain size or a smaller grain size, including any very small fines content. For example, if the target grain size is 1.0 mm, the particle fraction removed is consequently the amount of particles comprising particles having a grain size of not more than 1.0 mm or less. Larger particles remain in the hammer mill and can be processed further until they are also comminuted to a sufficient degree and are removed. All that is being effected here directly is thus the preferably continuous removal of the target fraction.

The target grain size here may be 1.0 mm, especially 0.8 mm. Such a target grain size is appropriate when the particulate recyclate is to be used as admixture to a casting compound for the production of new quartz composite moldings. This target grain size corresponds to the maximum filler grain size of the inorganic or organic fillers present in the casting compound and hence in the new product. The individual recyclate particles consist of the polymer matrix to some degree and contain inorganic or organic filler particles as were present in the recycled used part. The recyclate particles can then be used to supply a particular filler content of "used fillers" to the casting compound, in which case it is ensured on account of the choice of the target grain size of the recyclate particles that the filler particles supplied in this way will always have not more than the filler grain size as is to be present in the new molding.

By contrast, an alternative process configuration to the above-described variant in which the target fraction is removed directly from the hammer mill envisages removal of a first particle fraction having a maximum grain size greater than the target grain size of the particles that form the recyclate from the hammer mill via a sieve, followed by removal of a second particle fraction containing particles having a grain size equal to or less than the target grain size that form the recyclate from the first particle fraction in a downstream sieving device, and separation from a third particle fraction containing particles larger than the target grain size. In this process configuration, consequently, a first particle fraction coarser than the actual target fraction is sieved off from the hammer mill and then sieved in a sieving device for separation of the desired target fraction, the second particle fraction. Consequently, what takes place in the sieving device is a classification of the recyclate particles in the coarse first particle fraction taken from the hammer mill. It is possible using the sieve of the hammer mill via which the first particle fraction is removed to define not just the maximum grain size of the first particle fraction but also to vary the dwell time of the grinding material in the mill. The larger the sieve or sieve openings and hence the maximum grain size, the shorter the dwell time of the grinding material in the hammer mill; the smaller the sieve or maximum grain size, the longer the dwell time of the grinding material in the hammer mill, since more significant comminution is required to pass through the sieve. This goes hand-in-hand with the fact that the fines content, i.e. the proportion of particles having a very small grain size, which is also well below the target grain size of the target fraction, varies according to the sieve size used. In the case of a relatively large sieve and hence relatively short dwell time, the fines content is lower, whereas it is higher in the case of a relatively small sieve and relatively long dwell time.

In this process variant, what are consequently obtained in the sieving device are two separate fractions, namely the second particle fraction containing the particles that form the recyclate that are the same size or smaller than the target grain size, and the third particle fraction containing particles that are larger than the target grain size. It is possible here to use the second particle fraction either as final target fraction, but it is also possible to classify it further, which will be discussed in detail hereinafter. The third particle fraction may likewise be used further, if desired, which will likewise be discussed in detail hereinafter.

In one development of the invention, the maximum grain size of the first particle fraction may be 5 mm, especially 4 mm. This means that the sieve of the hammer mill has a corresponding mesh width of 5 mm, especially 4 mm; the classification can preferably be accomplished using a bar sieve that provides a sufficiently large sieve area that enables a reduction in the dwell time of the particles in the hammer mill. Although a maximum grain size <4 mm is conceivable in principle, there is then a notable rise in the fines content, i.e. the proportion of particles having a grain size well below the target grain size.

Here too, the target grain size should be 1.0 mm, especially 0.8 mm. This is especially true when the recyclate particles are to be added as admixture to a quartz composite casting compound for production of new moldings. Again, in this process variant too, the target grain size corresponds essentially to the maximum filler grain size of the inorganic or organic fillers present in the new molding.

As described, in this second process variant of the invention, a third particle fraction is obtained, containing particles larger than the maximum target grain size of the second particle fraction. It is preferable to return this third particle fraction to the hammer mill for further comminution. This means that these particles that are still too large are processed and comminuted again in the hammer mill until they have a grain size in the region of the target grain size or smaller, such that they form part of the second particle fraction in the downstream sieving step in the sieving device. This means that recycling is effected with regard to the third particle fraction, which can also be repeated, such that, proceeding from an applied fill volume of molding pieces, a yield of particulate recyclate of nearly 100% is possible.

As described above, the comminuted particles of the first particle fraction should be sent from the hammer mill to the sieving device, and the particles of the third particle fraction returned from the sieving device to the hammer mill. This transfer can be effected manually, meaning that material is transported by an operator manually from the hammer mill to the sieving device, or from the sieving device to the hammer mill, and introduced therein.

Preference is given, however, to automatic transport via an appropriate transport device. For instance, such a transport device for the transfer of the first particle fraction may, for example, be a conveyor belt, for example a Z conveyor that runs the first particle fraction from the hammer mill to the sieving device. A Z conveyor is appropriate since the first particle fraction is preferably drawn off at the bottom of the hammer mill, while it is fed to the sieving device from the top, with removal of the corresponding second and third particle fractions in the sieving device again preferably at the bottom.

It is likewise possible to provide a transport belt for the transport of the third particle fraction from the sieving device back to the hammer mill, for example a vibrating channel or the like.

If, for example, the third particle fraction is transported manually, the third particle fraction may, for example, be collected in a correspondingly large stock vessel, for example a Bigbag, and the filled stock vessel may then be transported to the hammer mill via an appropriate means of transport, such as a pallet truck or the like, for example to a conveyor belt beginning close to the floor, via which the grinding material to be applied is transported upward to the introduction point for the hammer mill.

The operation of the hammer mill and of the sieving device too may in principle be continuous, meaning that the hammer mill is supplied continuously with precomminuted molding pieces and, if envisaged, particles from the third particle fraction, and particles are drawn off continuously and are also fed continuously to the sieving device, where they are sieved continuously into the corresponding fractions. By means of such a continuous process, it is accordingly possible to operate with a notably high throughput. Alternatively, of course, it is also possible to envisage an intermittent process, in the course of which only a particular amount of grinding material is processed, without continuously supplying new grinding material. This is done only when the grinding material applied has been fully processed.

As described, a second particle fraction is separated from the first particle fraction in the sieving device by means of a sieve, which may be a mesh sieve or the like. This second particle fraction contains particles having a grain size that corresponds to a maximum of the target grain size, but may also be smaller and also much smaller, meaning that the second particle fraction also has a correspondingly high fines content, i.e. of very small particles having very small grain size. If the target grain size is, for example, 1.0 mm or 0.8 mm, the second fraction also includes particles having grain sizes of only 0.2 mm, 0.1 mm or even finer, down to pulverulent particles that can ultimately no longer be referred to as pellets. In principle, the second particle fraction, i.e. the target fraction, may also contain the fines content, for example as admixture for a casting compound. However, if the fines content is unwanted, an appropriate development of the invention envisages forming and removal of a fourth particle fraction having a maximum grain size smaller than the target grain size from the second particle fraction by sieving in the sieving device or a further sieving device, such that a fifth particle fraction containing the particles that form the recyclate remains and is drawn off. Thus, a further classification of the second particle fraction is thus effected in a second sieve plane in the sieving device. This second particle fraction is separated into a fourth particle fraction containing the unwanted fines content to be removed and a fifth particle fraction that then corresponds to the final target fraction. For this purpose, by means of a further sieve, for example a mesh sieve, a maximum grain size of the fourth particle fraction, i.e. the fines fraction, is defined, such that this fourth particle fraction contains solely particles that have this grain size or are even finer. The final fifth particle fraction, i.e. the target fraction, then contains solely recyclate particles having a grain size in the range between the target grain size and the maximum grain size of this second sieve plane. Thus, the target fraction ultimately contains only a negligibly small fines content, if any, which can have advantages in relation to the rheology of the casting compound to which the recyclate particles are added. If both sieving operations are effected in a common sieving device, successive corresponding sieve stages are provided. If two separate sieving devices are used, these may be connected, for example, via a transport device via which the second particle fraction is transported automatically to the second sieving device.

The maximum grain size of the fourth particle fraction should be 0.1 mm, especially 0.2 mm. The greater this maximum grain size, the smaller the interval within which the grain sizes of the final recyclate particles will lie.

According to the invention, sieving of the first particle fraction and/or sieving of the second particle fraction is accomplished in each case using mesh sieves having a defined mesh size, which enables corresponding separation and classification of the fractions.

The starting material used for the process of the invention is more preferably molding pieces having inorganic and/or organic filler particles with a proportion of 60 percent by weight (% by weight), especially 65% by weight, embedded in a polymer matrix. The molding pieces should thus contain a minimum proportion of inorganic and/or organic filler particles which is at least 60% by weight, but should preferably be higher. This means that the proportion of polymer matrix should not be too great, since the aim is to recycle fillers in particular via the recyclate, i.e. to supply them as recycled fillers to a casting compound for the new production of moldings.

As well as the comminuting of composite materials of various colors, it is preferably also possible to use the process described to comminute molding pieces having essentially the same color together in the hammer mill. The result of this is that the recyclate particles of the target fraction can ultimately have a uniform color. As stated, moldings, i.e. including the recycled moldings, typically contain color pigments that impart an individual color thereto. These color pigments, in the course of new production, are typically supplied to the casting compound via a color paste. Since the new parts are likewise to have a particular color, and since the recyclate particles will inevitably also contain color pigments, it has to be ensured that the recyclate particles do not alter the target color of the new molding defined by the color paste. Preference is therefore given in accordance with the invention to collectively comminuting solely molding pieces of the same type, i.e. of the same color, such that the recyclate particles have a uniform color. Of course, the molding pieces need not be completely identical in color; instead, it is also possible to collectively process molding pieces that vary slightly in color, for example anthracite gray moldings together with black moldings or the like, in which case it is of course the ratio of the amount of moldings having different color that ultimately defines the final mixed color.

The precomminuted, typically irregularly shaped molding pieces should preferably have a maximum length of about 40 cm, especially of about 30 cm. It is possible here for the molding pieces to be produced either by manual crushing of the moldings to be recycled, or by means of a suitable precomminution method, for example by means of a roll compressor in a container or the like, where the moldings are correspondingly broken up by means of a heavy roller.

The molding pieces themselves may be supplied to the hammer mill either manually or automatically by means of a transport device such as a transport belt.

Moldings used for processing may be different quartz composite moldings. Preference is given to processing those moldings that correspond to the moldings to be produced since the material composition of the used moldings corresponds essentially to that of the moldings to be newly produced. Thus, if the new moldings produced are kitchen sinks, used moldings used in accordance with the invention should likewise be kitchen sinks in the process of the invention. If such kitchen sinks are produced from different casting compound compositions, i.e. the kitchen sinks consist of different material compositions, it is additionally also conceivable that the recyclate to be added to the casting compound in each case is indeed produced using solely old kitchen sinks that correspond in terms of their material composition to that of the kitchen sink to be newly produced. However, this further specification is not obligatory.

As well as the process itself, the invention further relates to particulate recyclate produced by the process as described above.

The invention further relates to the use of a particulate recyclate as addressed above as admixture to a casting compound for production of a quartz composite molding, especially a kitchen sink.

The invention finally relates to a quartz composite molding, especially a kitchen sink, produced using an above-addressed particulate recyclate.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
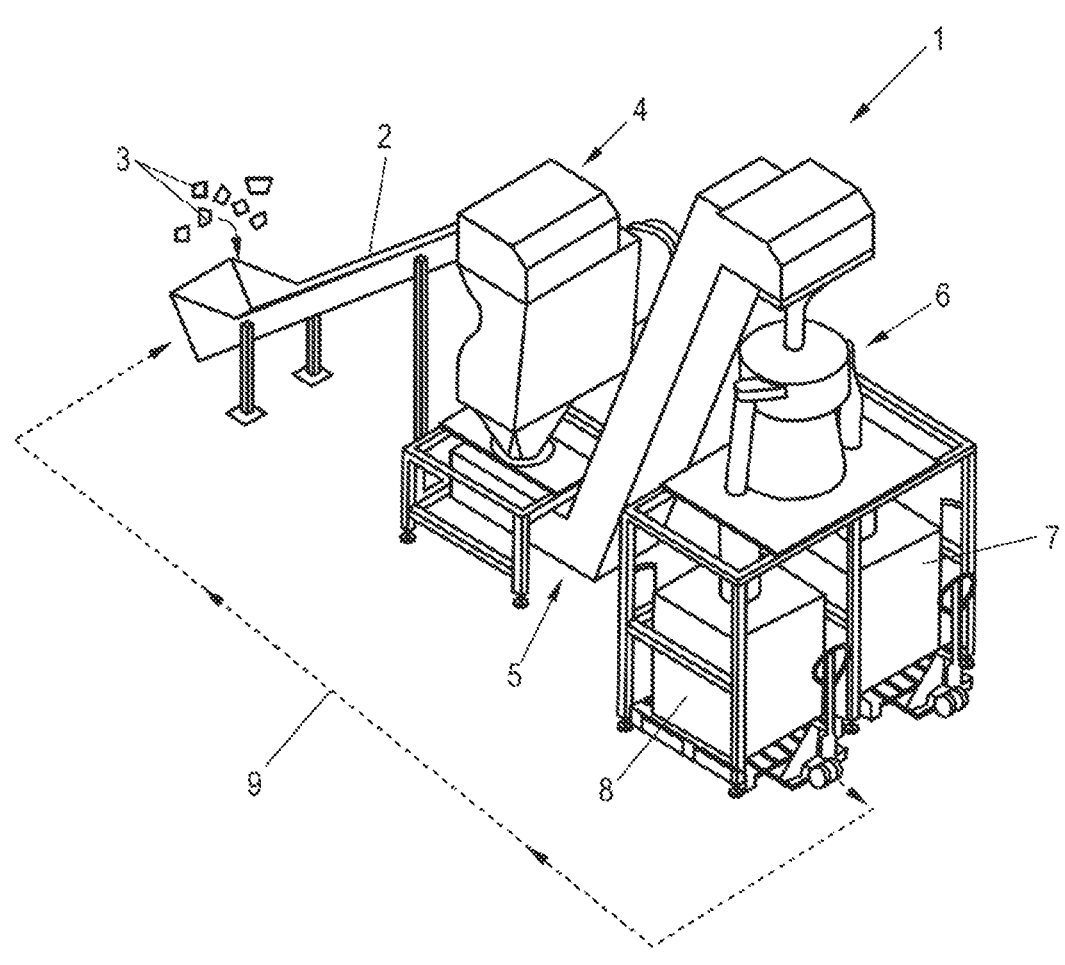
FIG. 1 a schematic diagram of an apparatus for production of a particulate recyclate from quartz composite by the process of the invention, FIG. 2 a flow diagram for elucidation of the process of the invention, FIG. 3 a diagram showing the grain size distribution of three different materials for grinding, FIG. 4 a diagram showing the influence of grain size on the product output through a sieve or an exit gap, FIG. 5 a diagram showing the grain size distribution in different successive grinding runs, and FIG. 6 a diagram showing the grain size distribution of successively ground materials for grinding each taken from a prior grinding operation.

FIG. 1 shows an apparatus 1 for production of a particulate recyclate from quartz composite. The apparatus 1, which is a mere schematic diagram, comprises a first transport device 2, for example a belt conveyor, to which transport device 2 precomminuted molding pieces 3 are applied. These precomminuted molding pieces 3 are fragments of a quartz composite molding and consist, like that molding, of a polymer matrix with inorganic and/or organic filler particles embedded therein and usually also color pigments. The moldings comminuted for formation of the molding pieces 3 are, for example, disused or unusable kitchen sinks.

By means of the first transport device 1, the molding pieces 3 are brought to a hammer mill 4, where they are comminuted by means of the rotating hammer or beater system. The molding pieces 3 are broken up here by means of the rotating hammers, meaning that the comminution process is brought about by introduction of impact energy, additionally combined with throwing of the comminuted pieces against the mill wall on account of the relatively high speed of rotation of the rotor or hammer of several tens of m/s, where they likewise break up.

Integrated in the hammer mill 4 is a sieve (not shown in detail), by means of which a first particle fraction having a maximum grain size greater than the target grain size of the particles that form the recyclate can be separated off. This means that particles having a grain size corresponding to the maximum grain size defined by the sieve or smaller than this maximum grain size fall through this sieve, for example a bar sieve. The parts that do not fall through the sieve remain in the hammer mill and continue to be beaten and consequently comminuted until they can also pass through the sieve.

The first particle fraction is then transported by means of a second transport device 5, a Z conveyor having a corresponding conveyor belt in the example shown, to a sieving device 6, and applied to the sieving device 6. The first particle fraction is sieved there in at least one sieve plane in order to form a second particle fraction containing the particles that form the recyclate. These particles of the second particle fraction have a grain size equal to or smaller than the target grain size. Additionally formed is a third particle fraction containing the particles larger than the target grain size. This means that the relatively coarse first particle fraction is classified in the sieving device 6 in order firstly to form a particle volume containing the particles that are ultimately within the target size range or smaller, and in order to form a third particle fraction containing particles larger than this volume of target grain particles.

In the working example shown, the second particle fraction from the sieving device 6 can be introduced into a receiving vessel 7 intended for transport away, for example on a pallet truck shown, and collected there until a particular fill level is attained, and then this second particle fraction is finally removed and sent to its further use, for example as admixture to a casting compound for the production of new kitchen sinks.

The third particle fraction too is received in a suitable receiving vessel 8. Since this third particle fraction consists of particles that are not within the target size range, and therefore are still too large, they are sent, as shown by the dotted line 9 that indicates a transport pathway, to the first transport device 2, where they are applied and sent again to the hammer mill 4 in order to be ground once again. This means that the excessively large third particle fraction is recycled. As a result of the new grinding operation, a sufficiently large particle content is comminuted further, such that these particles are then within the target size range and subsequently form part of the second particle fraction. This recycling of the third particle fraction to the first transport device 2 can be effected manually, for example by pulling the pallet truck shown here, by means of which the receiving vessel 8 can be moved. Alternatively, rather than the receiving vessel 8, it is also possible to provide a further transport device, for example a vibrating channel or a transport belt, onto which the particles of the third particle fraction fall or are applied, such that they are automatically recycled to the first transport device 2.

It is of course also possible to apply the second particle fraction, i.e. the target fraction, rather than into the receiving vessel 7 shown, also onto a transport device that conveys it away, such as a conveyor belt, by means of which it is transported, for example, to a remote packing station or the like.

As described above, in the working example shown, the sieving device 6 has just one sieve plane via which the first particle fraction is separated into the second and third particle fractions. The second particle fraction, as set out, includes particles having the target grain size at most, but which may also be smaller, down to a fines content with minimal grain size, i.e. grain sizes less than 0.2 or 0.1 mm. This fines content may remain in the second particle fraction if it is not disruptive to the subsequent further processing. However, it can also be removed if required. For this purpose, the sieving device has a second sieve plane in which the second particle fraction is sieved again, so as to form a fourth particle fraction containing solely the fines content, and a fifth particle fraction which is then the final target particle fraction. This further sieve plane, which, like the first sieve plane as well, is formed by means of a mesh sieve or the like, defines a maximum grain size smaller than the target grain size. This means that the fourth particle fraction, i.e. the fines fraction, contains solely particles that have this maximum grain size or are smaller, i.e. the entire fines content down to powder. By contrast, the fifth particle fraction contains solely particles that are smaller than or equal to the target grain size and are larger than this maximum grain size of the second sieve plane. The fourth and fifth particle fractions are then correspondingly removed. While the fifth particle fraction, i.e. the target fraction, is sent to reutilization, the fourth particle fraction, i.e. the fines fraction, can be discarded. This means that, in the apparatus shown in FIG. 1, rather than one receiving vessel 7, two such vessels are provided. One receiving vessel receives the fourth particle fraction, i.e. the fines and ultrafines content, while the other receiving vessel receives the final fifth particle fraction.

The maximum grain size of the first particle fraction as defined by means of the sieve of the hammer mill 4 is, for example, 5 mm, especially 4 mm. The gap width of the sieve should not be any smaller since the fines content in the grinding process will otherwise be too large.

The target grain size which is defined by the first sieve plane of the sieving device 6 should be about 1.0 mm, preferably about 0.8 mm.

The maximum grain size that defines the fines content should be about 0.1 mm, preferably about 0.2 mm. The effect of this is that the grain size of the particles comprising the final fourth particle fraction, i.e. the target fraction, is ultimately ≤1.0 mm and >0.1 mm, preferably ≤0.8 mm >0.2 mm.

Figure 2:
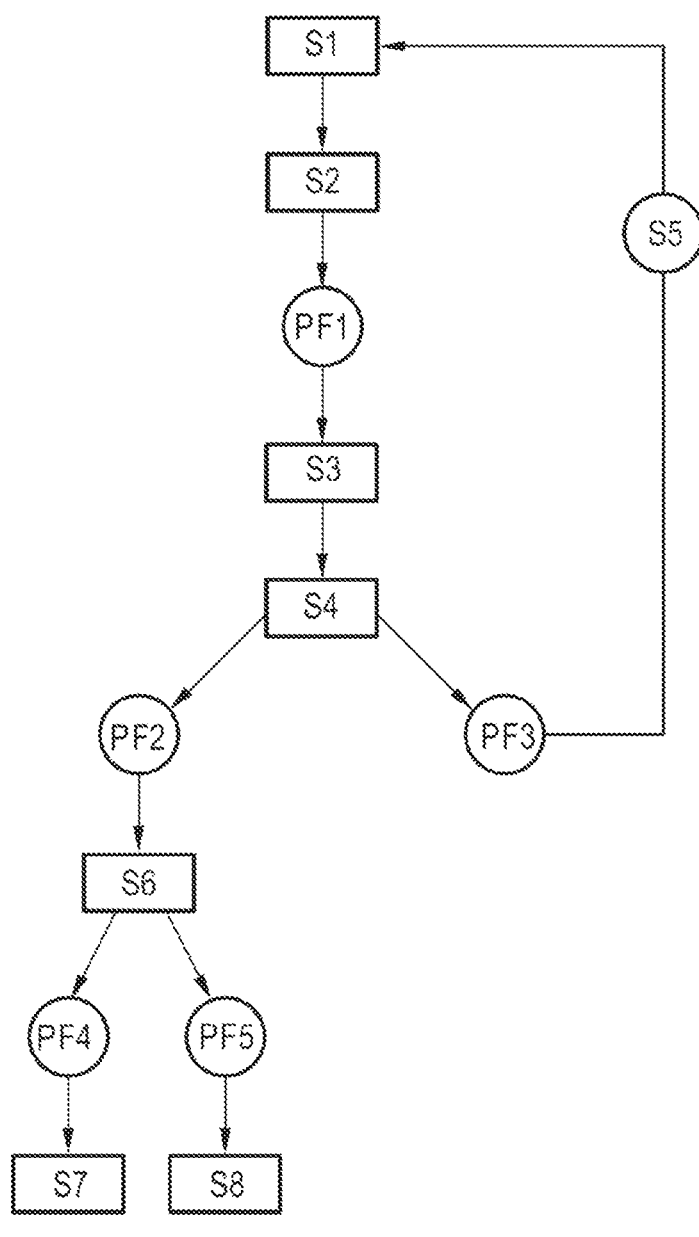

FIG. 2 shows a flow diagram that shows the individual steps of the process in principle, and also the particle fractions formed.

In step S1, the grinding material, i.e. the precomminuted molding pieces 3, is applied to the first transport device 2 and sent to the hammer mill 4.

In step S2, the grinding material applied is ground in the hammer mill 2. This grinding leads to formation of the first particle fraction PF1.

This first particle fraction PF1 is then removed from the hammer mill in step S3 via the sieve of the hammer mill 4 and sent via the second transport device 5 to the sieving device 6 and applied there.

In step S4, the first particle fraction PF1 is sieved in the sieving device 6, forming the second particle fraction PF2 and the third particle fraction PF3. For this purpose, the sieving device 6 has a first sieve that forms a first sieve plane, for example a mesh sieve or the like, by means of which the target grain size is defined. This is, for example, 1.0 mm or 0.9 mm or 0.8 mm, according to what the maximum target grain size of the final recyclate should be. This means that the second particle fraction PF2 includes particles having a grain size equal to or less than the target grain size of, for example, 1.0 mm or 0.8 mm.

By contrast, the third particle fraction PF3 comprises solely particles larger than the target grain size, i.e. having a grain size of greater than 1.0 mm or 0.8 mm. This third particle fraction PF3 is then fed automatically in step S5, for example via a transport device, back to the first transport device 2, such that it is fed to the hammer mill 4 again in step S1, where these particles that are still relatively large are ground again and recycled into the grinding and sieving circuit.

The second particle fraction PF2, as set out, contains particles that are smaller than or no more than equal to the target grain size. It accordingly also comprises a corresponding fines content, i.e. particles that are very much smaller. In order to remove this fines content, as shown by step S6, the second particle fraction PF2 is sieved by means of the sieving device 6 in a second sieve plane by means of a second sieve, for example a mesh sieve or the like, in order to form a fourth particle fraction PF4 and a fifth particle fraction PF5. The mesh size of the sieve of this second sieve plane in turn defines a maximum grain size, for example of 0.1 mm or 0.2 mm, which ensures that the unwanted fines content is sieved out. This means that the fourth particle fraction PF4 contains only very fine particles that form the fines content.

By contrast, the fifth particle fraction PF5 contains solely particles within the desired particle size interval which is defined at the upper end by the target grain size, i.e. the preferred grain size, and which is bounded at the lower end by the maximum grain size from which the fines content begins. The fifth particle fraction PF5 thus contains, for example, solely particles that are ≤0.8 mm and >0.2 mm.

In step S7, the fourth particle fraction is removed and can, for example, be discarded if the fines fraction cannot be reutilized in some other way. The final fifth particle fraction PF5 that can be processed further as recyclate, by contrast, is subsequently removed in step S6, for example after it has been collected in a receiving vessel, or by means of a transport device or the like.

In the course of studies, various quartz composite materials were ground by means of a hammer mill and the grinding outcome was determined.

In a first experiment, the grinding characteristics of three different quartz composite compositions were examined. The starting material was three of the applicant's quartz composite kitchen sinks consisting of different quartz composites.

One sink consisted of the applicant's material known by the Cristalite® brand name, the second sink consisted of the applicant's material known by the Cristadur® brand name, and the third sink consisted of the applicant's material known by the Cristadur® Green Line brand name.

The sinks made of the Cristadur® material, as well as the polymeric binder that forms the polymer matrix and is based on MMA, and color pigments, also include an inorganic filler in the form of quartz sand in a proportion of 68-75 percent by weight.

The sink made of the Cristalite® material, as well as the polymeric binder matrix and color pigments, includes an inorganic filler in the form of quartz sand in a proportion of 70-75 percent by weight.

The sinks were used to form molding fragments, meaning that the sinks were precomminuted, with a length of the fragments not exceeding 30 cm. In order to be able to process sufficient grinding material, multiple identical sinks of the respective sink type were comminuted in each case.

The grinding material was ground using an HM 672 hammer mill from Gebr. Jehmlich GmbH that works by the principle of beating and impact action. The rotating hammers beat the grinding material in the grinding space. Once the required purity has been attained, the grinding material leaves the grinding space at the bottom through a bar sieve. The bar sieve had a gap width of 4 mm, which restricts the proportion of larger particles that get through the sieve.

In this hammer mill, the respective grinding material of the various material types was ground. Grinding was effected until the entire grinding material applied had been ground.

Figure 3:
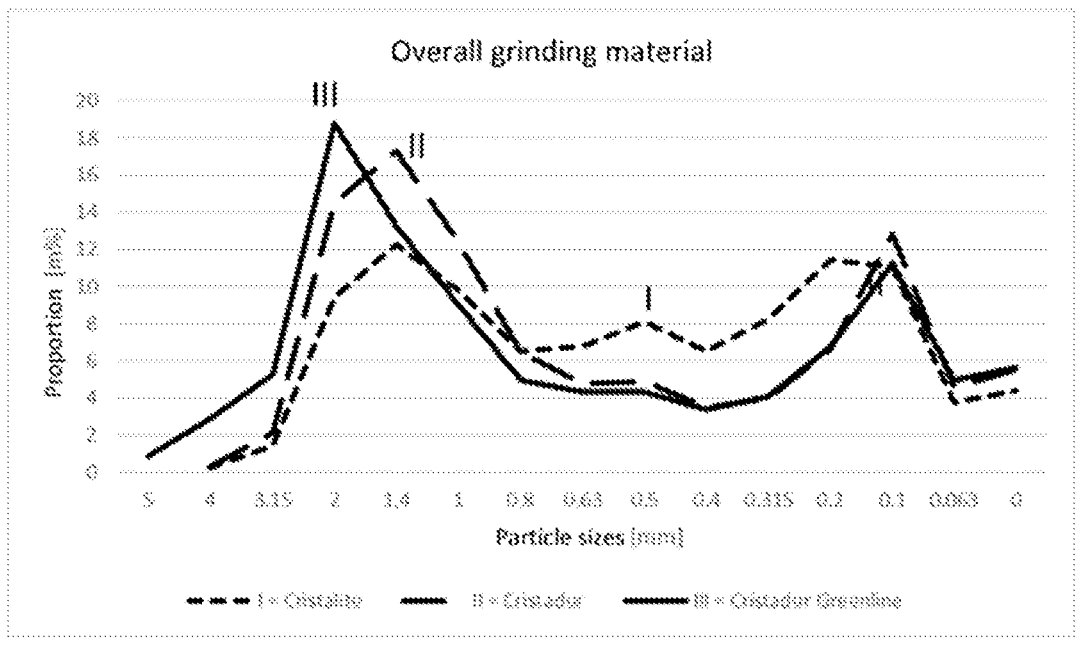

The result of the grain size distribution of the three different materials for grinding is shown in FIG. 3.

Shown along the abscissa is the particle size in mm, and along the ordinate the respective proportion in percent by mass.

The curve labeled I indicates the particle distribution for the Cristalite® material, the curve labeled II the distribution for the Cristadur® material, and the curve labeled Ill the distribution for the Cristadur® Greenline material.

It is found that the grinding material obtained for all the compositions examined shows a comparable grain size distribution. A first peak is found in the region between about 3.0-1.0 mm; a second peak is established in the region between 0.3-0.06 mm.

Formation of lumps or briquets of the respective material in the hammer mill did not occur in any of the materials examined, meaning that it was possible to grind the entire grinding material applied and remove it via the sieve.

For the production of new moldings, i.e. new kitchen sinks from the respective Cristalite® or Cristadur® materials, preference is given to using inorganic fillers, i.e. primarily quartz sand, having a maximum grain size of about 0.8 mm. For that reason, within the grinding material obtained, as shown above, the respective particle fraction with a grain size ≤0.8 mm is suitable.

The grinding material yields from the grinding experiments shown above in the diagram with a particle grain size of ≤0.8 mm is shown in the table below:

| Material | Cristalite ® | Cristadur ® | Cristadur ® Greenline |
|---|---|---|---|
| Yield about (%) | 60 | 48 | 45 |

This means that each material can be comminuted even in the first grinding operation in such a way that a sufficiently high particle content which is of a particular target grain size or smaller is already present here.

Figure 4:
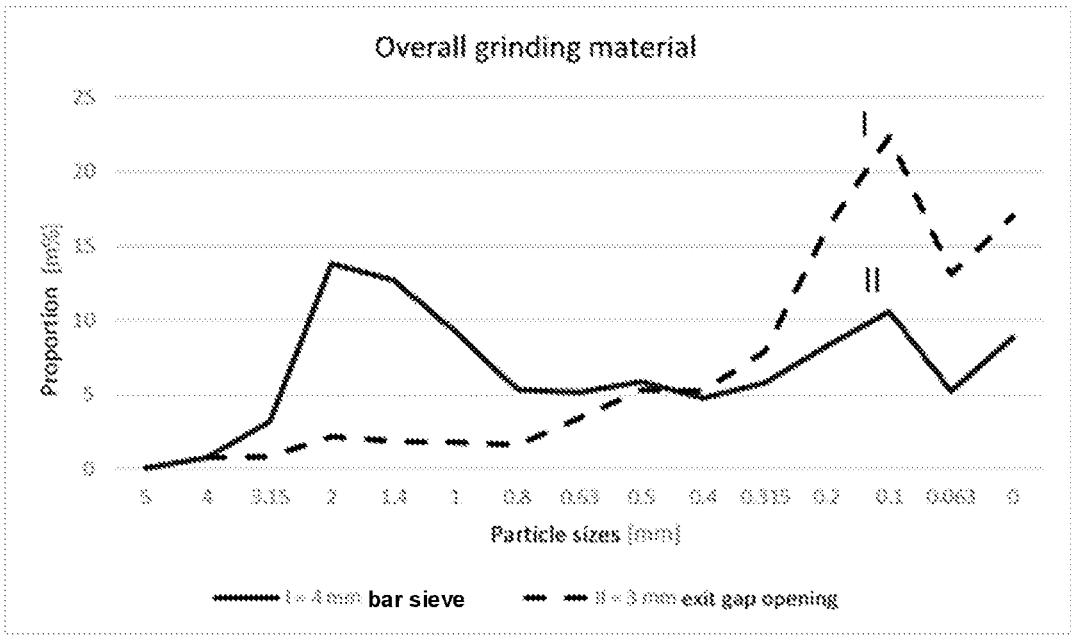

In a further experiment, in particular, the influence of the exit opening on the dwell time of the material in the mill and the resulting grain size distribution of the grinding material was examined. The experiments were conducted using a HA800 hammer mill from Erdwich Zerkleinerungssysteme GmbH with variable exit gap rather than a bar sieve for product discharge. The exit gap width was 3 mm. By virtue of the presence of only a single exit gap with relatively small opening width to the product discharge, the dwell time of the material in the mill was distinctly increased. The results are shown in FIG. 4.

Again, the particle size in mm is shown along the abscissa, i.e. the grain size, and again the respective percentage by mass of the grinding material along the ordinate. The curve labeled I indicates the particle size profile for a bar sieve width of 4 mm, and the curve labeled II the particle size profile for an exit gap opening of 3 mm.

It is apparent that, when the 4 mm bar sieve of the Jehmlich HM 672 hammer mill is used, the proportion of particles having a grain size between 4.0-0.5 mm is distinctly greater than in the case of curve II having an exit gap opening of 3 mm for the Erdwich HM800 hammer mill. This situation is reversed over and above a particle size of about 0.5 mm, meaning that the fines content is much greater in the inevitably longer-lasting grinding operation with the single exit gap opening of 3 mm than in the case of grinding with a bar sieve, where the material is discharged much earlier and hence the dwell time is distinctly shortened.

If the particle fraction having a grain size 0.8 mm is considered again here too, grinding with a single exit gap and with a resultant extension of the dwell time of the material in the hammer mill can achieve a greater yield of particles in the target size range; an increase in the above diagram to up to 90% was observed. But this is also associated with a distinct increase in the fine material content, with fine material being considered to be, for example, particles having a grain size 0.2 mm. Should an excessively high fines content be undesirable, the sieve size chosen must not be too small.

As already described above for FIGS. 1 and 2, the first particle fraction taken from the hammer mill 4 is sieved in the sieving device 6. A second and a third target fraction are formed, with the third target fraction, as described, containing particles having a grain size greater than the target grain size of the desired recyclate particles. This third particle fraction can be recycled again to the hammer mill 4 for grinding again.

In a further experiment, the efficiency of a second grinding operation in relation to the yield of suitable grinding material was examined, meaning that the material to be ground was ground for a first time in the hammer mill and then the first particle fraction was classified in the sieving device, and then the third particle fraction was returned to the hammer mill and ground for a second time, and then classified again in the sieving device. The material examined was a quartz composite material of the Cristalite® type.

Figure 5:
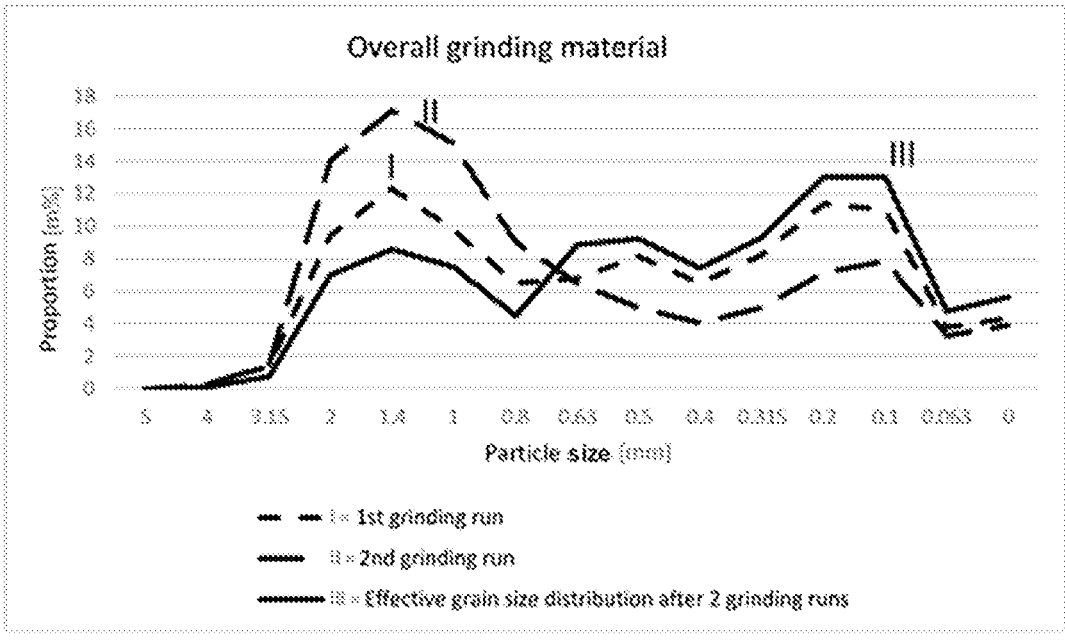

The results are shown in FIG. 5. Here too, the particle size distribution in mm is again plotted along the abscissa, and the respective percentage along the ordinate.

The curve labeled I shows the particle or grain size distribution after the first grinding run, the curve labeled II the particle or grain size distribution after the second grinding run, and the curve labeled III the effective particle or grain size distribution after the two grinding runs.

The first grinding run results in a grain size distribution in which there is already a notably large proportion of particles in the target size range, i.e. ≤0.8 mm.

In the second grinding run, the particle volume coming from the first grinding run, which was >0.8 mm, is ground again in the hammer mill, meaning that the oversize from the first grinding run was applied again. As shown by curve II, the result of this grinding operation too is a particle fraction having particles <0.8 mm, and also a particle fraction containing larger particles as before. However, the comminution ratio in this second grinding run is less than in the first grinding run.

However, it is found that recycling of the oversize, i.e. of the third fraction according to the above description of figures, affords another yield of particles within the target size range.

This is also shown by the curve labeled III, which shows the effective grain size distribution after two grinding runs. By far the predominant proportion of the grinding material after two grinding runs is already within the desired particle size range of ≤0.8 mm, and therein primarily within the desired particle size interval between 0.8-0.2 mm. This means that repeated reapplication of the oversize, i.e. of the third particle fraction, can achieve a continuous increase in yield up to virtually 100%.

As well as experiments with inventive use of a hammer mill, a further grinding process for comminution of quartz composite moldings was also examined. In this case, a multistage comminution was undertaken by means of a roll crusher and a roll mill. Grinding was effected in 4 stages.

In the first grinding stage, a BB 400/250 jaw crusher from Merz Aufbereitungstechnik GmbH was used to crush precomminuted molding pieces having a maximum length of 30 cm; the crusher gap was 20 mm.

In a second grinding stage, the grinding material from the first grinding stage that was removed via the crusher gap was ground in a roll crusher with a pyramidal cam profile of the WBG 5/4 type from Merz Aufbereitungstechnik GmbH; the crusher gap here was 1.0 mm.

The grinding material from the second grinding stage that has passed through the crusher gap, i.e. the fines from grinding stage two, was then ground further in a WBP 6/4 roll mill from Merz Aufbereitungstechnik GmbH; the mill gap was set at 1.5 mm.

In a fourth grinding stage, the grinding material that passed through the mill gap in grinding stage three, i.e. the fines obtained therein, was then ground again in the roll mill, but the crusher gap was then set to 0.5 mm.

Figure 6:
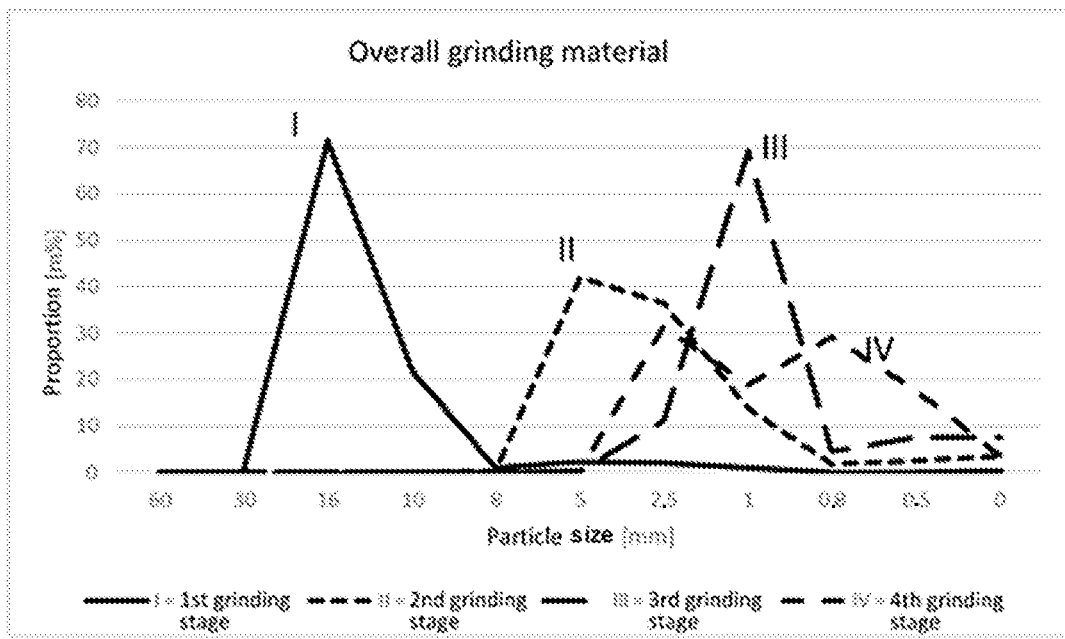

The individual grinding results were each classified with regard to particle size; the results are shown in FIG. 6.

The curve labeled I indicates the particle size distribution of the grinding material coming from the first grinding stage. The curve labeled II indicates the particle size distribution of the grinding material obtained from the second grinding stage. The curve labeled III indicates the particle size distribution of the grinding material obtained from the third grinding stage. The curve labeled IV indicates the particle size distribution of the grinding material obtained from the fourth grinding stage.

In the first grinding stage, the molding pieces resulting from the large crusher gap are merely coarsely comminuted; it is apparent that there is virtually no formation of a particle content here within the target size range, i.e. preferably 0.8 mm. The yield of recyclate particles in the target size range here is only about 0.3% of the total material applied.

In the second grinding stage, only the proportion coming from the first grinding stage that passes through the crusher gap was ground. It is found that further comminution is possible in the second stage, but here too only an almost negligible particle content within the target size range of ≤0.8 mm is found. The yield of particles ≤0.8 mm was about 5.9%.

The grinding material fraction that passed through the crusher gap of grinding stage two was then ground in the third grinding stage in a roll mill with a mill gap of width 1.5 mm. The result is shown by means of curve III.

Here too, a high peak is found in the grain size range between about 2.5-8 mm; almost all the material is obtained within this range. By contrast, here too, only a small particle content within the target size range of ≤0.8 mm has been obtained.

In the fourth grinding stage, the particle content obtained in the third grinding stage that has passed through the crusher gap was then ground once more in the roll mill, but now with a smaller crusher gap of 0.5 mm. The grinding outcome is shown by curve IV. This shows a broader grain size distribution in the region of ≤2.5 mm, meaning that further comminution has taken place. There is also an increase in the proportion of particles in the target size range of ≤0.8 mm. Nevertheless, the yield of material in the target size range is only about 46%. In addition, it is observed that the proportion of relatively coarse material has increased somewhat compared to the third grinding stage. This is attributable to formation of briquets, which occurs in this grinding method that involves shear. The briquetted material that has stuck together has a higher grain size than the original material from the third grinding stage.

This means that, at the end of the four-stage grinding process, only a fraction of the material originally applied can be exploited at all, since the grinding material processed within each of the individual grinding stages has been continuously reduced in volume, since only the proportion passing through the corresponding screen or gap was processed further in each case. In order to arrive at a grinding material that leads to some kind of acceptable yield at all, three preceding grinding operations were required in the present case. The material applied in this fourth grinding step already had a notably small maximum grain size, resulting from the third grinding stage with a crusher gap of 1.5 mm. Even the grinding of this already extremely precomminuted material (the starting material was, as stated, the molding pieces having a length of about 30 cm that were applied in the first grinding step) achieves only a yield of about 46% by experiment, meaning that more than half of the grinding material obtained is not within the target size range.

Furthermore, on the one hand as early as in the third grinding stage, but on the other hand in the fourth grinding stage as well, formation of lumps or briquets of the grinding material, i.e. of the composite pellets, was detected, which ultimately leads to a considerable deterioration in the yield of material in the target size range. This formation of lumps or briquets results, as already set out, from sticking of the material stressed by shear in the roll mill, which leads to significant heating and softening of the polymer matrix, i.e. of the resin binder, resulting in sticking of the particles.

By contrast, the process of the invention permits, in a single grinding step proceeding from coarse precomminuted molding pieces, preferably with a length of not more than 30 cm, the formation of a notably large target particle fraction, i.e. a fraction comprising particles of, for example, ≤1.0 mm or ≤0.8 mm, depending on how the maximum target grain size is defined. Furthermore, the process of the invention shows the advantage that there is no formation of briquets, i.e. lumps, meaning that the material not within the target size range can be ground again unproblematically. It is also possible to conduct a continuous prolonged grinding process since there is no high energy input on account of the impact stress on the grinding material, unlike in the case of shear stress, as utilized, for example, by the above-described mill types as comminution method.

It is therefore possible by the process of the invention using a hammer mill to conduct an efficient and economically appropriate production of a particulate recyclate from quartz composite.

The recyclate produced, which, as stated, appropriately has a maximum grain size corresponding to the maximum grain size of the inorganic or organic filler, for example quartz sand, used in the new production of a molding, especially a kitchen sink, is rather simple. All that is required is to pretreat the recyclate particles prior to introduction into the casting compound. As set out, the recyclate particles also contain the polymeric binder matrix to a certain degree, i.e. an acrylic matrix, which, since the non-pretreated recyclate particles are introduced into the casting compound, swell slightly in the monomeric acrylate present therein, which leads to an increase in viscosity of the casting compound. In order to avoid any change in the rheological properties of the casting compound or of an intermediate, for example the color paste, to which the recyclate can be added, the recyclate particles merely have to be preswollen with a suitable amount of monomeric acrylate. This means that an appropriate amount of monomeric acrylate is added to the recyclate pellets such that the particles can swell, generally with completion of swelling after no later than 24 hours. The progression of the swelling can be followed by rheology.

The recyclate particles thus pretreated are then added to the casting compound either directly as a separate intermediate or, for example, to the color paste, which is then fed into the casting compound. The casting compound may thus be processed by diecasting like a standard casting compound, but contains a considerable proportion of recycled, i.e. reused, fillers.

Although the example in the sieving device 6 involves separation both of the first particle fraction into particle fractions PF2 and PF3 and of the second particle fraction PF2 into particle fractions PF4 and PF5, i.e. two sieving stages are provided, it would also be conceivable to use a further separate sieving device for the separation of PF2 into PF4 and PF5, to which the second particle fraction PF2 is fed from the sieving device 6 via a transport device.

While specific embodiments of the invention have been shown and described in detail to illustrate the inventive principles, it will be understood that the invention may be embodied otherwise without departing from such principles.

We claim:

1. A process for producing a particulate recyclate from quartz composite, comprising the steps of: comminuting quartz composite moldings composed of a polymer matrix with inorganic and/or organic filler particles embedded therein, in which precomminuted pieces of molding are comminuted in a hammer mill to form particles that form the recyclate; removing a first particle fraction, using a sieve, having a maximum grain size greater than a target grain size of the particles that form the recyclate from the hammer mill; and then, in a downstream sieving device, removing, from the first particle fraction, a second particle fraction containing particles having a grain size equal to or less than the target grain size that form the recyclate and separating out a third particle fraction containing particles larger than the target grain size.

2. The process according to claim 1, wherein a sieve is used to remove a particle fraction comprising particles having a maximum target grain size that form the recyclate.

3. The process according to claim 2, wherein the target grain size is 1.0 mm.

4. The process according to claim 1, wherein the maximum grain size is 5 mm.

5. The process according to claim 1, wherein the sieve for obtaining the first particle fraction is a bar sieve.

6. The process according to claim 1, wherein the target grain size is 1.0 mm.

7. The process according to claim 1, wherein the third particle fraction is returned to the hammer mill for further comminution.

8. The process according to claim 1, wherein the particles of the first particle fraction that are comminuted in the hammer mill are transferred to the sieving device and/or the particles of the third particle fraction from the sieving device are returned to the hammer mill manually or via a transport device.

9. The process according to claim 1, wherein, in the sieving device or a further sieving device, a fourth particle fraction having a maximum grain size less than the target grain size is formed from the second particle fraction by sieving and removed, so as to leave a fifth particle fraction containing the particles forming the recyclate which is removed.

10. The process according to claim 9, wherein the maximum grain size of the fourth particle fraction is 0.1 mm.

11. The process according to claim 1, wherein sieving of the first particle fraction and/or sieving of the second particle fraction is accomplished by using a mesh sieve in each case.

12. The process according to claim 1, wherein molding pieces comprising inorganic and/or filler particles embedded in a polymer matrix with a proportion of ≥60% by weight are used.

13. The process according to claim 1, wherein the pre-comminuted molding pieces have a maximum length of 40 cm.

14. The process according to claim 1, wherein the moldings for are formation of the molding pieces comminuted manually or by means of a comminution apparatus.

15. The process according to claim 1, wherein the molding pieces are fed to the hammer mill manually or by means of a transport device.

16. The process according to claim 1, wherein the moldings used are sinks.

17. The process according to claim 2, wherein the target grain size is 0.8 mm.

* * * * *